(12) United States Patent
Sugahara (10) Patent No.: US 8,312,213 B2
(45) Date of Patent: Nov. 13, 2012

(54) METHOD TO SPEED UP ACCESS TO AN EXTERNAL STORAGE DEVICE AND AN EXTERNAL STORAGE SYSTEM

(75) Inventor: Noriaki Sugahara, Nagoya (JP)

(73) Assignee: Buffalo Inc., Nagoya-shi (JP)

(*) Notice: Subject to any disclaimer, the term of this patent is extended or adjusted under 35 U.S.C. 154(b) by 185 days.

(21) Appl. No.: 12/843,749

(22) Filed: Jul. 26, 2010

(65) Prior Publication Data

US 2011/0022799 A1 Jan. 27, 2011

(30) Foreign Application Priority Data

Jul. 27, 2009 (JP) .................................. 2009-174023

(51) Int. Cl.
*G06F 12/00* (2006.01)
*G06F 13/00* (2006.01)
(52) U.S. Cl. ................. 711/113; 711/1; 711/2; 711/3; 711/100; 711/115; 711/118; 711/129; 711/141; 711/143; 711/154
(58) Field of Classification Search .............. 711/1, 2, 711/3, 100, 113, 115, 118, 129, 154, 141, 711/143
See application file for complete search history.

(56) References Cited

U.S. PATENT DOCUMENTS

| | | | |
|---|---|---|---|
| 5,289,581 A * | 2/1994 | Berenguel et al. ............ | 711/113 |
| 6,975,752 B2 | 12/2005 | Dixon et al. | |
| 2002/0032671 A1* | 3/2002 | Iinuma ............................ | 707/1 |

FOREIGN PATENT DOCUMENTS

| | | |
|---|---|---|
| JP | 8-36527 | 2/1996 |
| JP | 8-328944 | 12/1996 |
| JP | 11-161527 | 6/1999 |
| JP | 2000-259499 | 9/2000 |
| JP | 2003-10163 | 1/2003 |
| JP | 2003-223334 | 8/2003 |
| JP | 2003-330794 | 11/2003 |
| JP | 2004-126844 | 4/2004 |
| JP | 2005-38591 | 2/2005 |
| JP | 2005-293837 | 10/2005 |
| JP | 2008-282428 | 11/2008 |
| JP | 2009-70379 | 4/2009 |

OTHER PUBLICATIONS

Decision of Rejection dated Apr. 19, 2011 from Japanese Application No. 2009-174023.
Notification of Reason for Rejection dated Jan. 18, 2011 for Japanese Application No. 2009-174023.
Nikkei Pasokon, Jul. 13, 2009, pp. 38-53.

* cited by examiner

*Primary Examiner* — Midys Rojas
(74) *Attorney, Agent, or Firm* — Beyer Law Group LLP (57) ABSTRACT

A method to speed up access to an external storage device for accessing to the external storage device comprises the steps of:
(a) during startup of a computer, setting up part of a physical memory of the computer as a cache memory for use by the external storage device, in the form of a continuous physical memory area outside the physical memory area that is managed by an operating system of the computer;
(b) upon detection of a request to write data to the external storage device, writing the data to the cache memory; and
(c) sending the data written in the cache memory to the external storage device to be saved therein.

4 Claims, 12 Drawing Sheets

METHOD TO SPEED UP ACCESS TO AN EXTERNAL STORAGE DEVICE AND AN EXTERNAL STORAGE SYSTEM

CROSS REFERENCE TO RELATED APPLICATIONS

The present invention claims priority from Japanese Application JP2009-174023 filed on Jul. 27, 2009, the content of which is hereby incorporated by reference into this application.

BACKGROUND OF INVENTION

The present invention relates to access to an external storage device of a computer.

While hard disk drives have been widely used to date as external storage devices for computers, more recently, SSD (Solid State Drives) are starting to come into use as well.

With an SSD, when large numbers of small files are being overwritten, processing time can sometimes be considerable due to a phenomenon known as "stutter". This is due to the fact that SSDs use flash memory as storage elements. Typically, with a flash memory, it is not possible to overwrite a block only partially. When an SSD overwrites data, data of all pages of the block that includes the page being overwritten and not being overwritten are deleted, and subsequently data of all of the pages are written to the block; stuttering occurs during this time. For this reason, conventional technologies setting up a cache memory area for SSD in the main memory of the computer have been adopted in the past. With the conventional technologies, however, because the cache memory area set up in the main memory is managed by the computer's OS, it is possible that lower access speeds to the SSD may be associated with such management by the OS. Accordingly, there exists a need to prevent the lower access speeds associated with conventional management of cache memory by the OS, and to speed up the perceived speed of access to SSD. Similarly, there exists a need to speed up the perceived speed of access to memory devices other than SDD as well. For example, in the case of a hard disk unit, if a single file is written in segments, the write time may be considerable due to the need for considerable travel of the head.

SUMMARY OF THE INVENTION

In order to address the above issue at least in part, it is an object of the present invention to speed up the perceived speed of access to computer storage devices. The present invention is addressed to attaining the above objects at least in part according to the following modes of the invention.

Mode 1:
A method to speed up access to an external storage device for accessing to the external storage device, comprising the steps of:
(a) during startup of a computer, setting up part of a physical memory of the computer as a cache memory for use by the external storage device, in the form of a continuous physical memory area outside the physical memory area that is managed by an operating system of the computer;
(b) upon detection of a request to write data to the external storage device, writing the data to the cache memory; and
(c) sending the data written in the cache memory to the external storage device to be saved therein.

According to this mode, cache memory for use of the external storage device is set up as continuous physical memory area not managed by the computer's operating system, thereby making it possible to prevent lower access speed in association with management by the operating system, and to speed up the perceived speed of access to a computer storage device.

Mode 2:
The method in accordance with claim 1, wherein the step (a) includes the step of
if the physical memory capacity exceeds a maximum manageable capacity of the operating system to have an excessive physical memory area that exceeds the maximum manageable capacity and a manageable physical memory area managed by the operating system, setting up the cache memory preferentially in the excessive physical memory area than in the manageable physical memory area.

According to this mode, the reduction in the physical memory area managed by the computer's operating system can be kept to a minimum, and slower speed of the operating system can be prevented, thereby making it possible to increase the perceived speed of access to an external storage device as a result.

Mode 3:
The method in accordance with claim 2, wherein the step (a) includes the step of
if a remainder left after subtracting the maximum manageable capacity of the operating system from the physical memory capacity is less than the capacity of the cache memory, reducing the amount of physical memory managed by the operating system by an equivalent of the remainder.

According to this mode, because cache memory is acquired on a preferential basis, it is possible to increase the perceived speed of access to an external storage device.

Mode 4:
An external storage system for use by a computer, comprising:
a computer having a physical memory;
an external storage device; and
management software for accessing to the external storage device;
wherein the management software:
sets up part of the physical memory of the computer as a cache memory for use by the external storage device, in the form of a continuous physical memory area outside the physical memory area that is managed by the operating system of the computer;
upon detecting a request to write data to the external storage device, writes the data to the cache memory; and
sends the data written in the cache memory to the external storage device to be saved therein.

According to this mode, because the cache memory for use of the external storage device is set up as continuous physical memory area not managed by the computer's operating system, thereby making it possible to prevent lower access speed in association with management by the operating system, and to speed up the perceived speed of access to a computer storage device.

It is additionally possible for the present invention to be embodied in various other modes besides a method of speeding up access to an external storage device, for example, an external memory storage, a program for speeding up access to an external storage device, or the like.

BRIEF DESCRIPTION OF THE DRAWINGS

Preferred embodiments of the present invention will now be described in conjunction with the accompanying drawings, in which.

DESCRIPTION OF THE PREFERRED EMBODIMENTS

Figure 1:
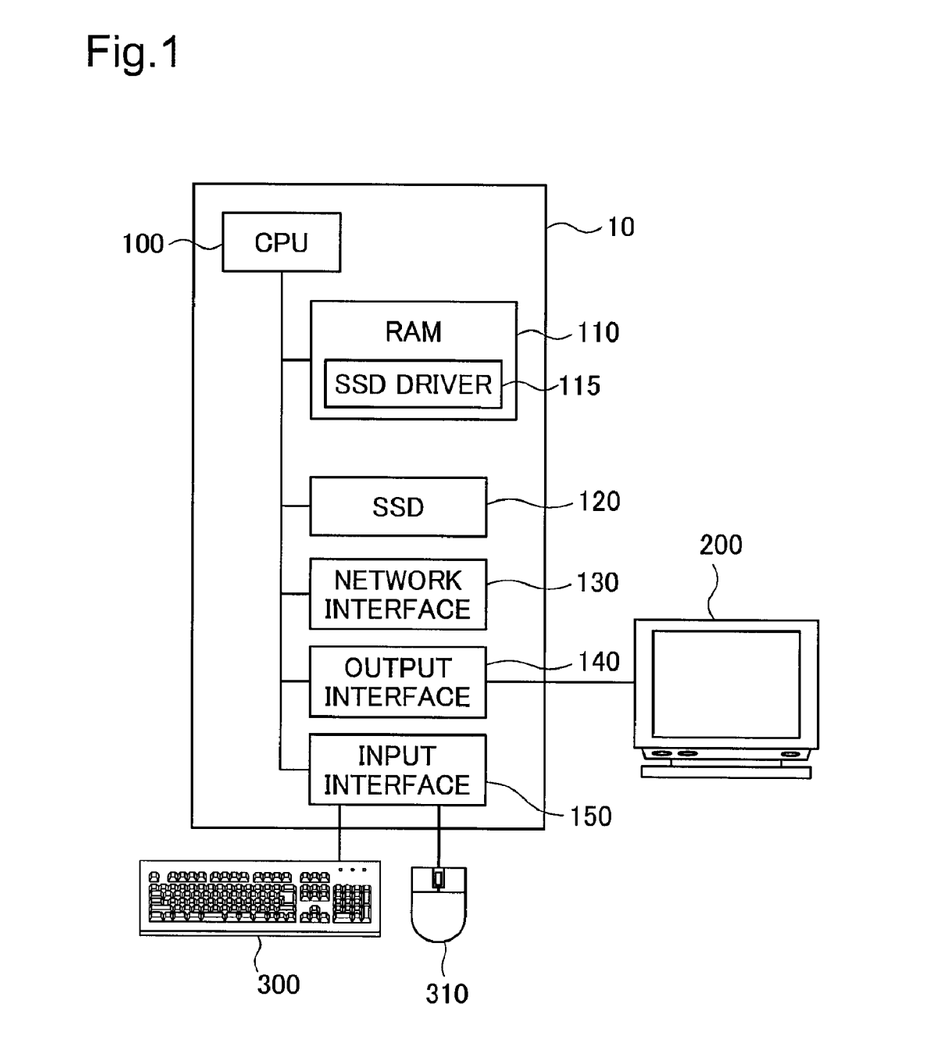
FIG. 1 is an illustration depicting the features of a computer according to a first embodiment.

FIG. 1 is an illustration depicting the features of a computer according to a first embodiment. The computer 10 has a CPU 100, a RAM 110, an SSD (Solid State Device) 120, a network interface 130, an output interface 140, and an input interface 150. A monitor display 200 is connected to the output interface 140, and a keyboard 300 and mouse 310 are connected to the input interface 150.

The SSD 120 is a type of external storage device that stores an OS, device drivers, application programs, and data. The CPU 100 loads the OS and device driver or application program into RAM 110 from the SSD 120, and executes it. In the example shown in FIG. 1, an SSD driver 115 provided as a device driver for the SSD has been loaded into RAM 110.

Figure 2:
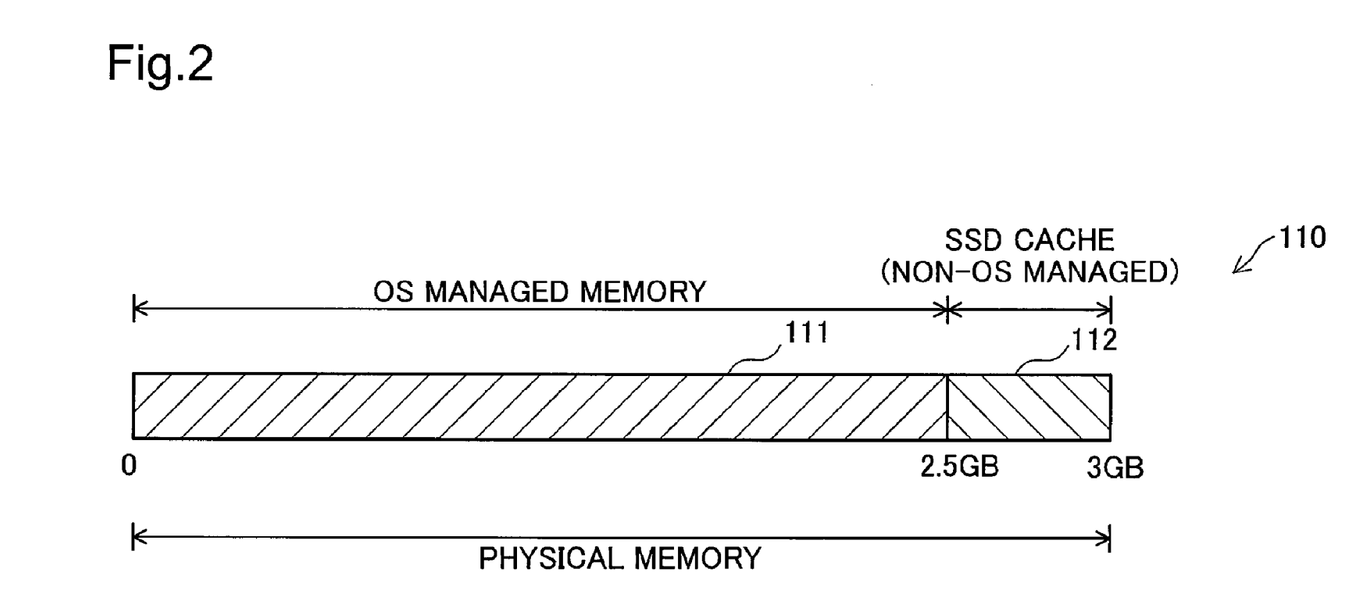
FIG. 2 is an illustration of a RAM memory map.

FIG. 2 is an illustration of a RAM memory map. In the present embodiment, the RAM 110 has a capacity of 3 GB, of which 2.5 GB is under management by the OS. This area is called the OS-managed area 111. The OS-managed area 111 stores the OS, application programs, device drivers, and data, with the data being accessible directly from the OS or application programs. The remaining 0.5 GB is provided as an SSD cache 112. The SSD cache 112 exists outside the OS-managed area and cannot be accessed directly from the OS or application programs; however, the SSD cache 112 is accessible by the SDD device driver 115. The size of the OS-managed area 111 and the SSD cache 112 may be varied according to the setting. This setting will be discussed later.

Figure 3A:
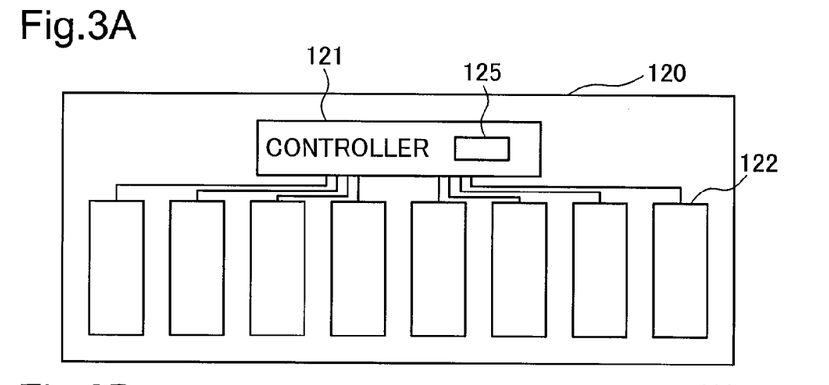
FIG. 3A is an illustration depicting the features of the SSD 120.

FIG. 3A-3C are illustrations depicting the features of the SSD 120. As depicted in FIG. 3A, the SSD 120 has a controller 121 and flash memories 122. The controller 121 has a buffer memory 125. In the present embodiment, the SSD 120 has eight flash memories 122 that are parallel connected with each other. The number of flash memories 122 is determined by the flash memory 122 capacity and the capacity of the SSD 120. The SSD 120 may have a parity flash memory (not shown) in addition to these flash memories 122.

Figure 3B:
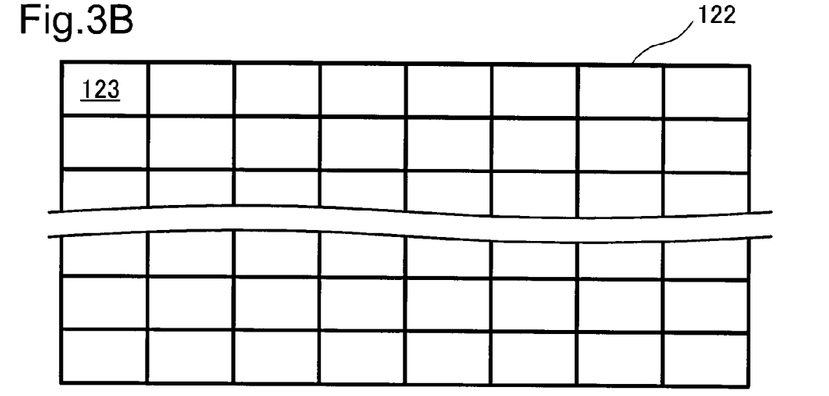
FIG. 3B is an illustration depicting the features of the flash memory.

FIG. 3B is an illustration depicting the features of the flash memory. The flash memories 122 have several blocks 123. In the present embodiment, the size of each block 123 is 256 kbits. However, other block sizes, for example 512 kbits or 1024 kbits, are possible as well. In general, it is preferable for block size to be 2n bits (where n is a natural number). In the present embodiment, the eight flash memories 122 are parallel connected, and identical addresses in each flash memory 122 are accessed simultaneously, so in the SSD 120, one block is 256 kB. The blocks 123 represent units for erasing data in the SSD. Here, erasing of data refers to withdrawal of the stored electron from a floating gate (not shown) of the flash memory (data from 0 to 1).

Figure 3C:
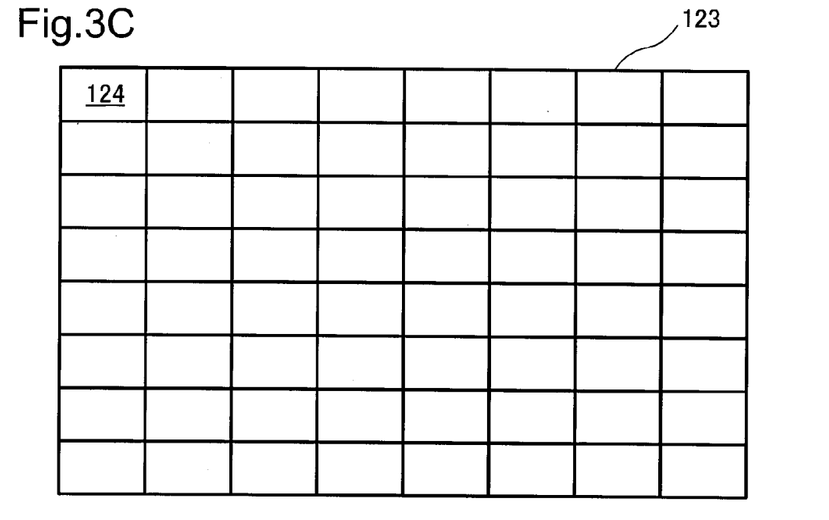
FIG. 3C is an illustration depicting block configuration.

FIG. 3C is an illustration depicting block configuration. The block 123 has several pages 124. In the present embodiment, the size of the pages 124 is 4 kbits. However, a different page size, such as 8 kbits for example, may be used. In general, it is preferable for page size to be 2m bits (where m is a natural number). In the present embodiment, one block has 64 pages. The number of pages in one block is varied according to the size of the block 123 and the pages 124. A page 124 is the unit in which data is written. Here, writing of data refers to injection of an electron into a floating gate (not shown) of the flash memory (data from 1 to 0).

In the SSD 120, it is not possible for data of a given page 124 of a given block 123, such as the data "10101010", to be overwritten directly with the data "01010101" for example. That is to say, SSD erases the data once so that the data becomes "11111111", followed by writing of the data "01010101". As noted above, because data erasing is took place in block units, for the data of the pages 124 in a given block 123 apart from the page 124 being overwritten, the SSD 120 first saves the data to the buffer memory of the controller, and after erasing the data from the block 123, rewrites it to the block 123. For example, in the present embodiment, overwriting even a single bit requires reading and erasing the equivalent of 64 pages of data, and then writing the equivalent of 64 pages of data.

Figure 4A:
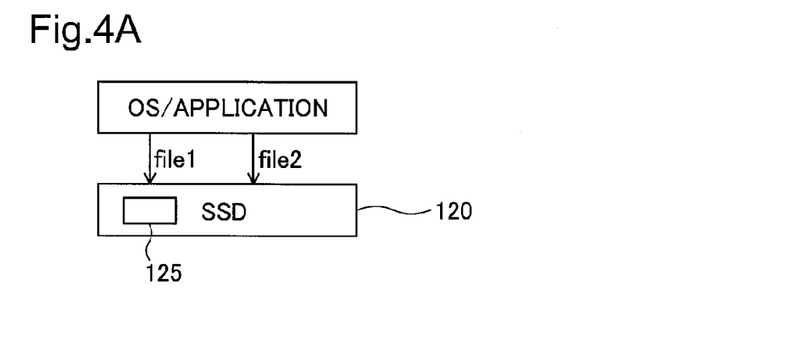
FIG. 4A is an illustration depicting in model form write operations to an SSD, in the case of a main memory lacking an SSD cache.

FIG. 4A is an illustration depicting in model form write operations to an SSD, in the case of a main memory (RAM 110) lacking an SSD cache. As depicted in FIG. 4A, where a file write operation is performed by the OS or by an application, the operation takes place in file units. Specifically, for the File1 write operation, the SSD 120 performs erasing and writing of the block. Erasing and writing of the block is performed similarly for the File2 write operation as well. Thus, in the case SSD writes a large number of files, the larger number of block erasing and writing cycles means that overwriting of the files is time-consuming.

Figure 4B:
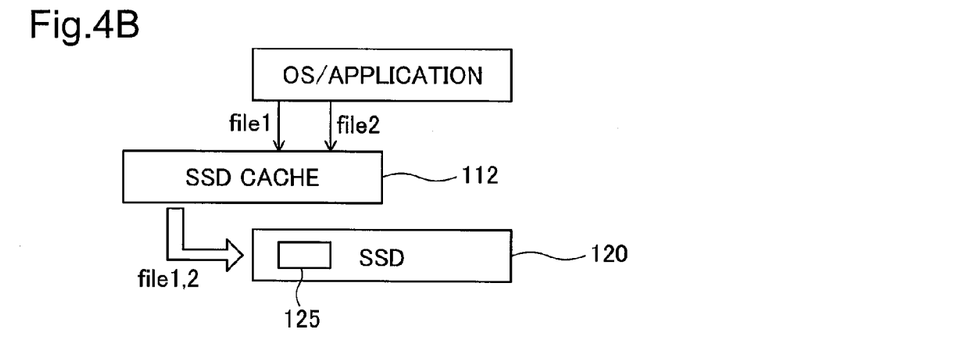
FIG. 4B is an illustration depicting write operations for a main memory provided with an SSD cache.

FIG. 4B is an illustration depicting write operations for a main memory provided with an SSD cache. First, writing of File1 and 2 to the SSD cache 112 is carried out.

Figure 4C:
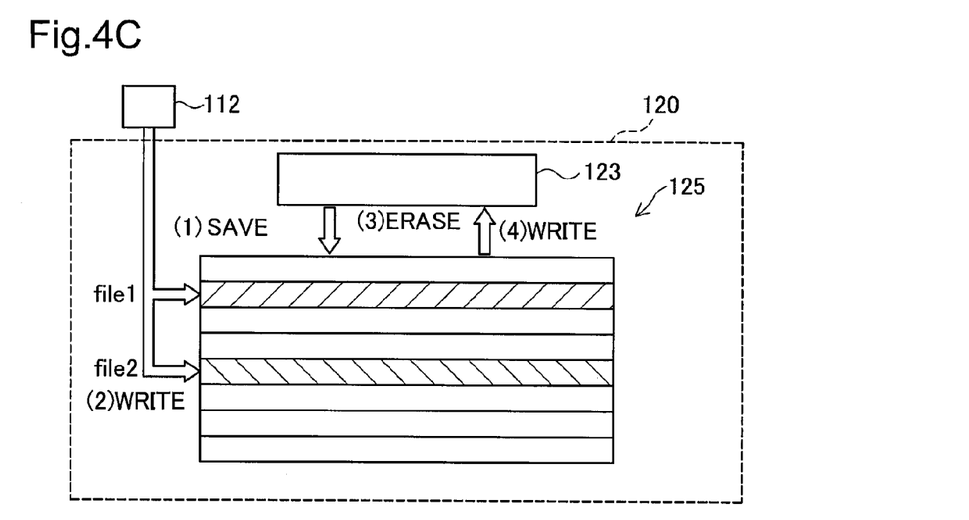
FIG. 4C is an illustration depicting write operations from the SSD cache 112 to the SSD 120.

FIG. 4C is an illustration depicting write operations from the SSD cache 112 to the SSD 120. Here, it is assumed that File1 and File2 are being written to the same block 123. The data of the block 123 to which File1 and File2 are being written is saved to the buffer memory 125 of the SSD 120 by the controller 121 (FIG. 3A) of the SSD 120. Next, File1 and File2 in the SSD cache memory 112 are written to this buffer memory 125. At this time, the controller 121 may write File1 and 2 to the buffer memory 125 first, and thereafter write the data of the pages 124 that are not being overwritten by File1 and 2 to the buffer memory 125. Then, after erasing the data of the block 123, the controller 121 writes the contents of the buffer memory 125 to the block 123.

Figures 5A, 5B, 5C:
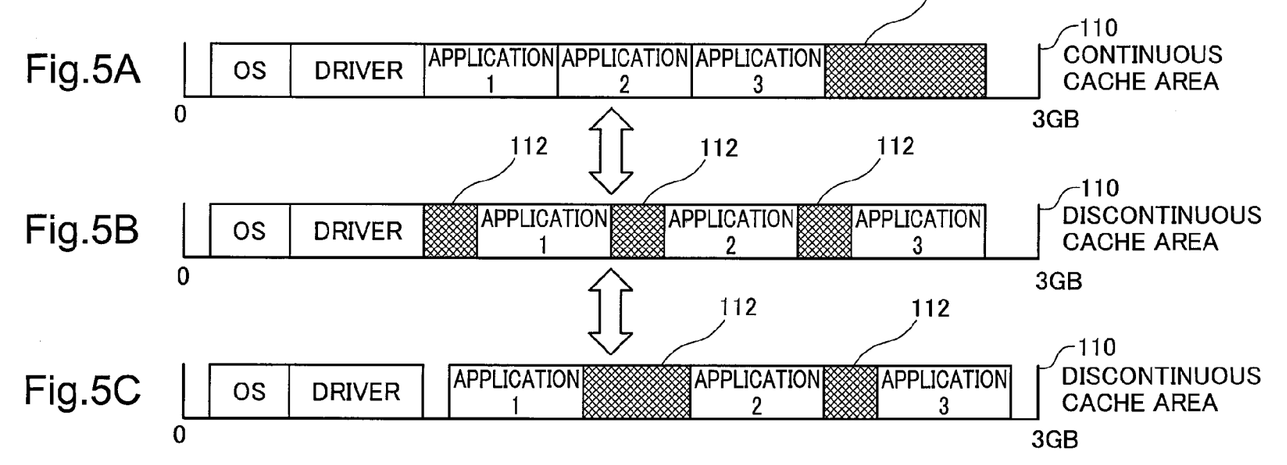
FIGS. 5A-5C are illustrations depicting an example of memory mapping where an SSD cache 112 is provided in the memory area managed by the OS.

By way of a comparative example, FIG. 5 is an illustration depicting an example of memory mapping where an SSD cache 112 is provided in the memory area managed by the OS. In the example depicted in FIG. 5A, a continuous SSD cache 112 has been acquired. In the examples depicted in FIGS. 5B and 5C, a continuous SSD cache 112 has not been acquired. Here, when the OS acquires the SSD cache 112, the OS does not fix the cache to any of those depicted in FIG. 5A to 5C; rather, changes the states depicted in FIG. 5A to 5C dynamically according to usage by an application. Specifically, the OS manages usage of the memory 110 by shifting among the states depicted in FIG. 5A to 5C in such a way that the physical memory can be utilized efficiently. However, such management by the OS does not necessarily result in an optimal state for writing to the SSD 120, that is, a state in which the SSD cache 112 is continuous. For example, if the SSD cache 112 is fragmented as depicted in FIG. 5B or 5C, efficient cache control during write operations to the SSD 120 will not be possible.

Figure 6:
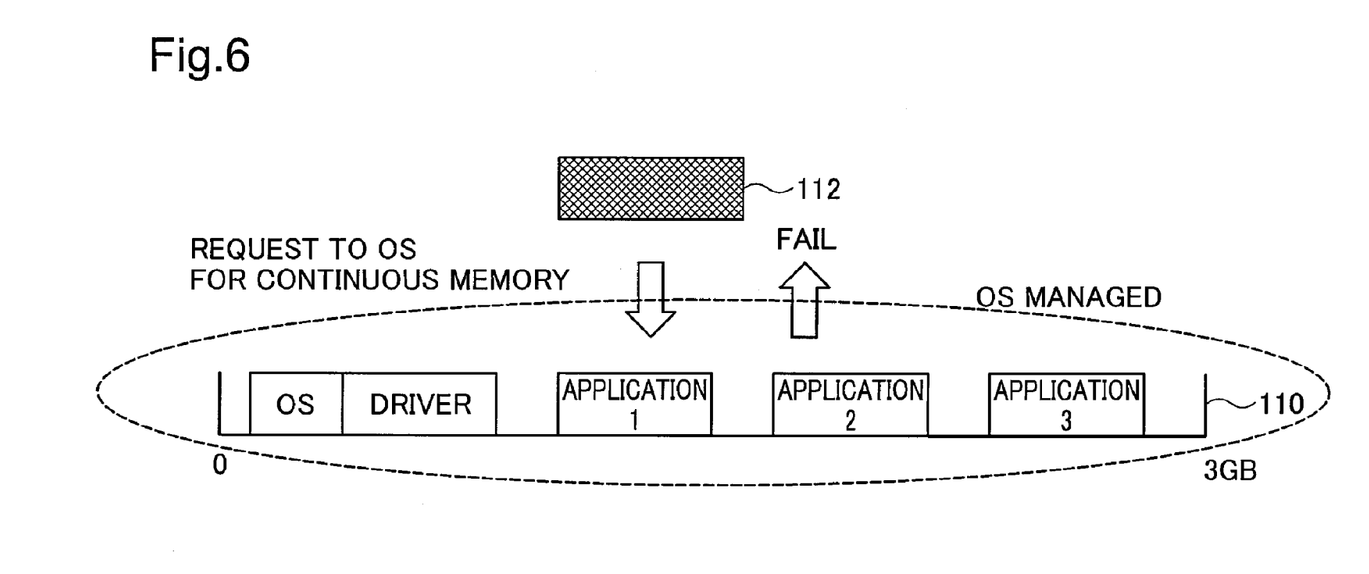
FIG. 6 is an illustration depicting a request to the OS to set up a continuous physical memory area as the SSD cache 112.

As another comparative example, FIG. 6 is an illustration depicting a request to the OS to set up a continuous physical memory area as the SSD cache 112. Under the conditions depicted in FIG. 6, even if the OS attempts to acquire a continuous physical memory area as a cache 113 for use by the SSD 120, the absence of sufficient continuous free memory in the memory 110 means that the continuous SSD cache 112 cannot be acquired. Thus, in this instance, the result is that no cache memory whatsoever is set up in the SSD.

Figure 7:
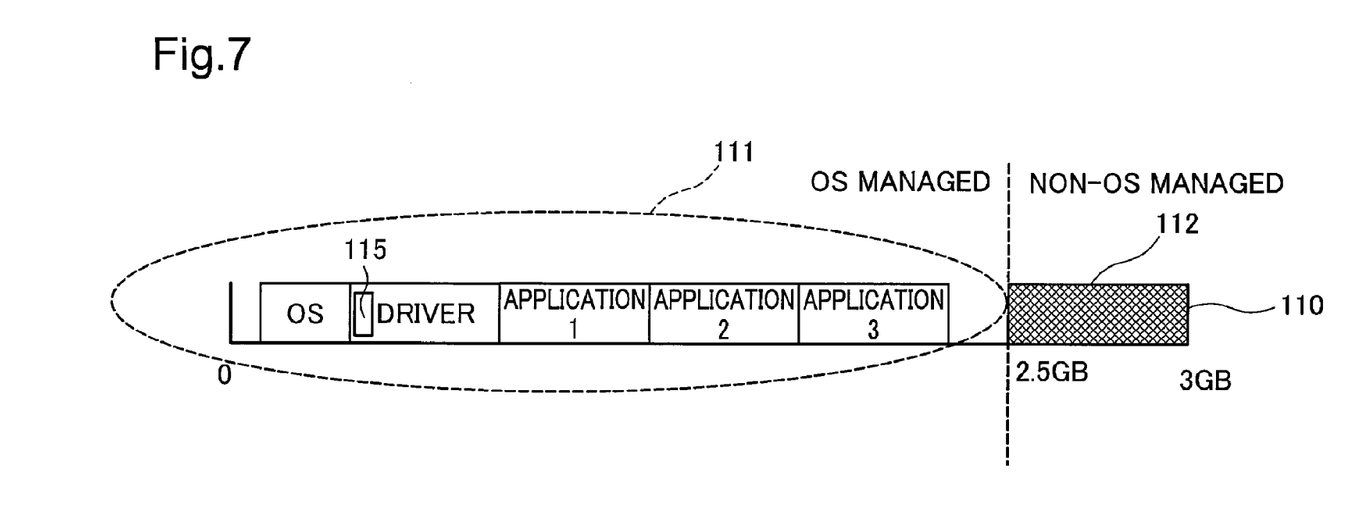
FIG. 7 is an illustration depicting the memory map in the present embodiment that sets up an SSD cache not managed by the OS.

FIG. 7 is an illustration depicting the memory map in the present embodiment that sets up an SSD cache not managed by the OS. In this example, the capacity of the RAM 110 is 3 GB, of which 2.5 GB is allocated as the area managed by the OS, and a capacity of 0.5 GB is allocated as the SSD cache 112. The SSD cache 112 is provided outside the management of the OS, and is allocated as a continuous area of physical memory.

Figure 8:
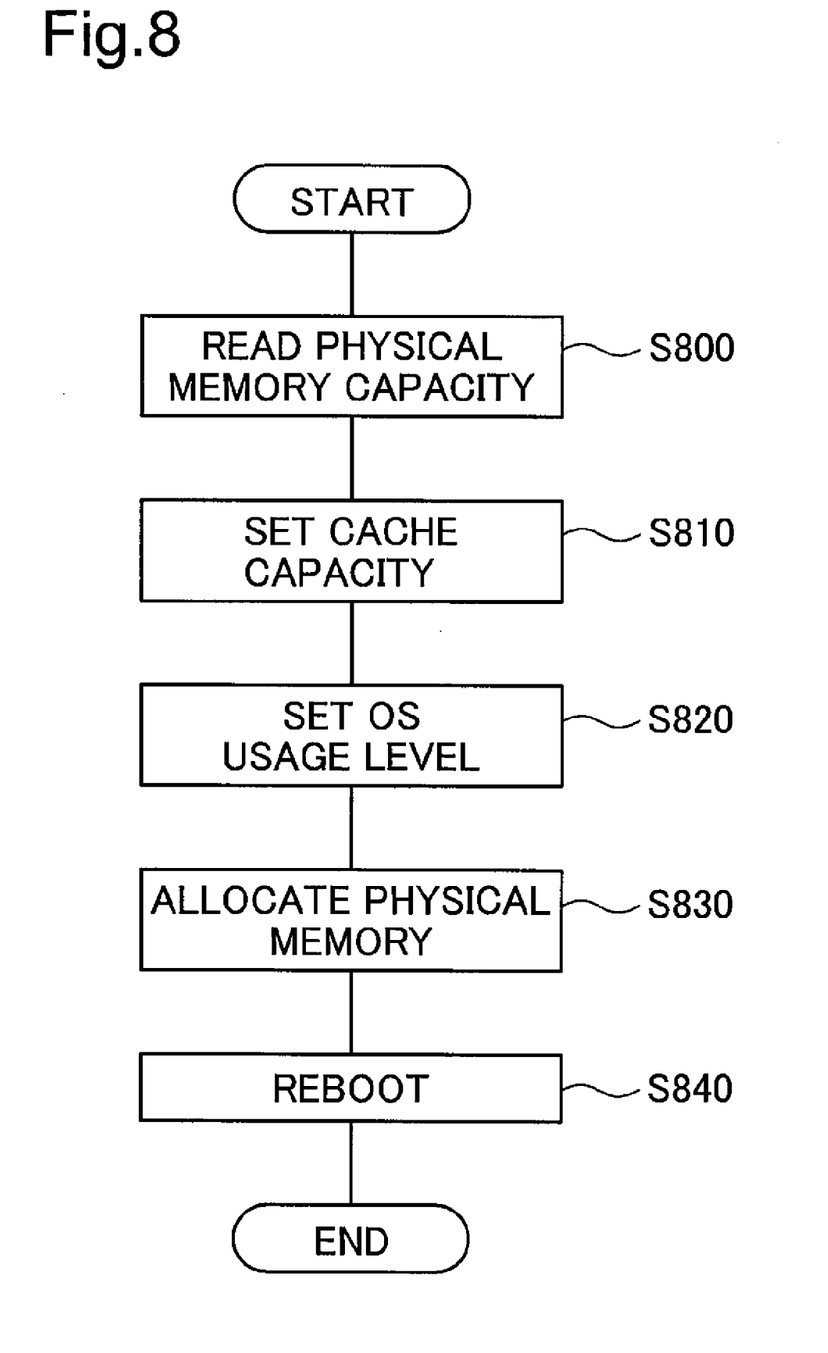
FIG. 8 is a flowchart depicting the procedure for installing or changing the settings of the SSD driver 115.

FIG. 8 is a flowchart depicting the procedure for installing or changing the settings of the SSD driver 115. In Step S800, the SSD driver 115 install program (herein termed simply the "install program") acquires the amount of physical memory (RAM 110) installed in the computer 10 from the OS. Specifically, it is possible to acquire physical memory capacity from the BIOS (not shown) for example.

In Step S810, the install program acquires the capacity value for the SSD cache 112. This value may be input by the user from an interface screen that is displayed on the monitor display 200 for example.

In Step S820, the install program sets up an amount of memory to be used by the OS. Specifically, the SSD cache 112 capacity whose value was acquired in Step S810 is subtracted from the physical memory capacity that was acquired in Step S800, to arrive at the memory capacity for use by the OS.

In Step S830, the install program sets up a memory usage level for the OS and a memory usage level for the SSD cache. For example, if the OS is Windows (Windows is a registered trademark of Microsoft Corp.), it is possible for the install program to limit the area used by the OS to 2.5 GB by inserting the line /MAXMEM=2560 (the /MAXMEM=nn switch) into the Boot.ini file that the OS uses at startup for example. This setting becomes effective upon restart in Step S840. The /MAXMEM=nn switch is a switch for setting the amount of memory that the OS can use at startup. Here, nn denotes a numerical value that specifies capacity in megabyte (MB) units. Because there are instances in which some software can cause problems due to a consuming a large amount of memory, the /MAXMEM=nn switch was initially provided for the purpose of limiting the amount of memory that the OS can use, in order to prevent such problems. While the /MAXMEM=nn switch is used in the present embodiment, the /BURNMEMORY=nn switch could be used instead. This switch specifies, in MB units, the amount of memory that Windows cannot use. The install program also sets up the physical address of the SSD cache 112 based on memory usage by the OS and the capacity of the SSD cache 112.

In Step S840, the install program displays on the monitor display 200 a message prompting the user to perform a reboot.

Figure 9:
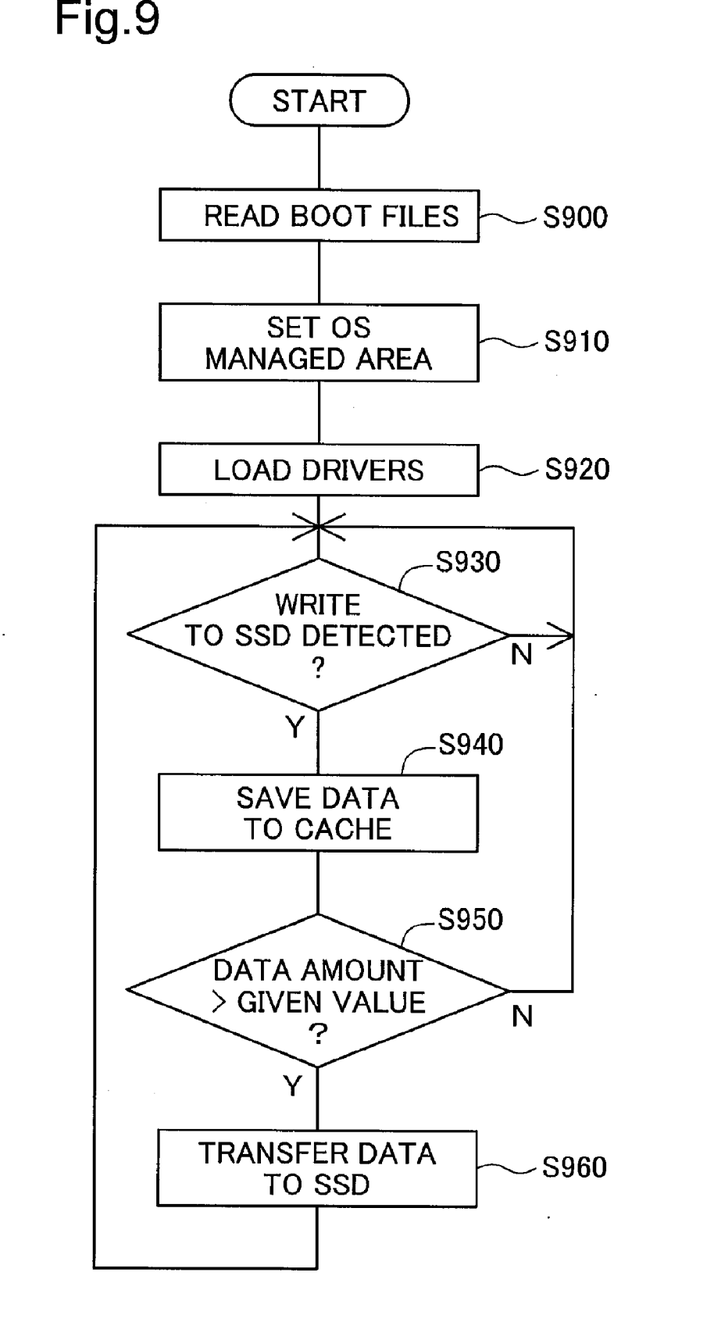
FIG. 9 is an illustration depicting operation of the computer subsequent to rebooting.

FIG. 9 is an illustration depicting operation of the computer subsequent to rebooting. In Step S900, the boot files are read. The boot files include the boot.ini file. The CPU 100 reads the value of the /MAXMEM=nn switch in the boot.ini file. In Step S910, using the value described by the /MAXMEM=nn switch in the boot.ini file, the CPU sets up a memory area managed by the OS. In Step S920, the OS loads the SSD driver 115 from the SSD 120 into the RAM 110. The SSD driver 115 is loaded into the OS managed area 111. The SSD driver 115 is able to access the SSD cache 112 outside of the OS managed area 111 of the RAM 110.

In Step S930, when the SSD driver 115 detects a request to write data to the SSD 120, in Step S940 the SSD driver 115 saved the data to the SSD cache 112. Saving of data to the SSD cache 112 is the determining factor as regards the perceived speed of access to the SSD 120 from the user's point of view. Consequently, it is possible for the user to given the impression that data was saved to the SSD 120 at high speed.

In Step S950, when the size of the data saved in the cache 122 has reached or exceeded a given value, the SSD driver 115 transfers the data from the cache 112 to the SSD 120, and writes the data to the SSD 120 (Step S960). This given value may be equal to the block 123 size in the SSD 120. By so doing, even if two or more files in the same block are being overwritten, a single block erasing cycle suffices, so less time is required for overwriting as compared to instances in which the SSD data is overwritten on file-by-file basis. As a result, stuttering can be reduced. The timing of data transfer from the SSD cache 115 to the SSD 120 may be set arbitrarily.

According to the present embodiment described above, an SSD cache 115 is set up in a continuous physical memory area not managed by the OS, and when data is written to the SSD 120, the data is initially saved to the SSD cache 115, and then the data is transferred in batch form to the SSD 120. As a result, the perceived speed of writing to the SSD 120 is faster, and it is possible to reduce stuttering.

Figure 10:
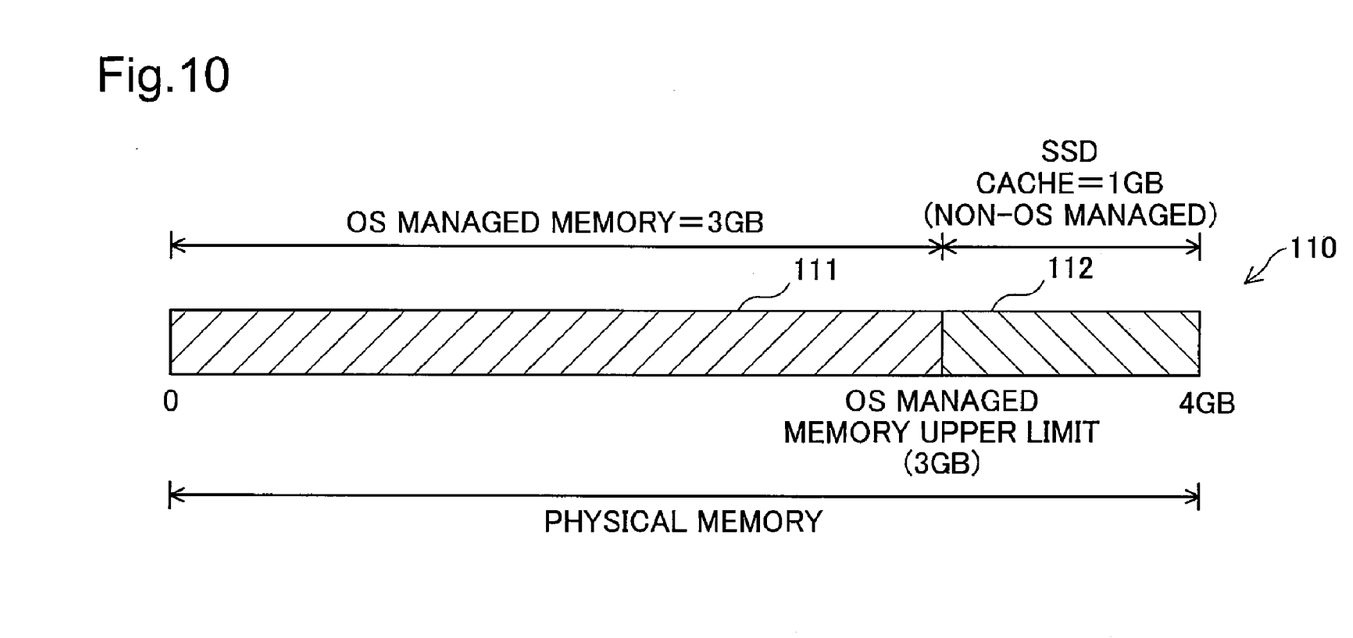
FIG. 10 is an illustration depicting the memory map in a second embodiment.

FIG. 10 is an illustration depicting the memory map in a second embodiment. Whereas Embodiment 1 above described an instance in which the installed amount of physical memory was 3 GB, Embodiment 2 describes an instance in which the installed amount of physical memory (RAM 110) is 4 GB. This 4 GB of physical memory exceeds the upper memory limit of the OS. The "upper memory limit of the OS" refers to the maximum value for the area that the OS is able to use as an area for storing the OS, applications, device drivers, and data (the OS-managed area 111), and as such represents the maximum capacity that the OS is able to manage. This value is not dependent on the amount of the RAM 110 installed in the computer 10; the 32-bit version of Windows has an upper memory limit of 3 GB for example. This upper memory limit differs depending on the OS and the edition. For example, the 64-bit versions of Windows have upper memory limits between 8 GB and 128 GB, depending on the edition. In Embodiment 2, the SSD cache 112 uses 1 GB, which is equivalent to the upper memory limit of 3 GB subtracted from the 4 GB of physical memory. The SSD cache 112 is not managed by the OS.

Figure 11A:
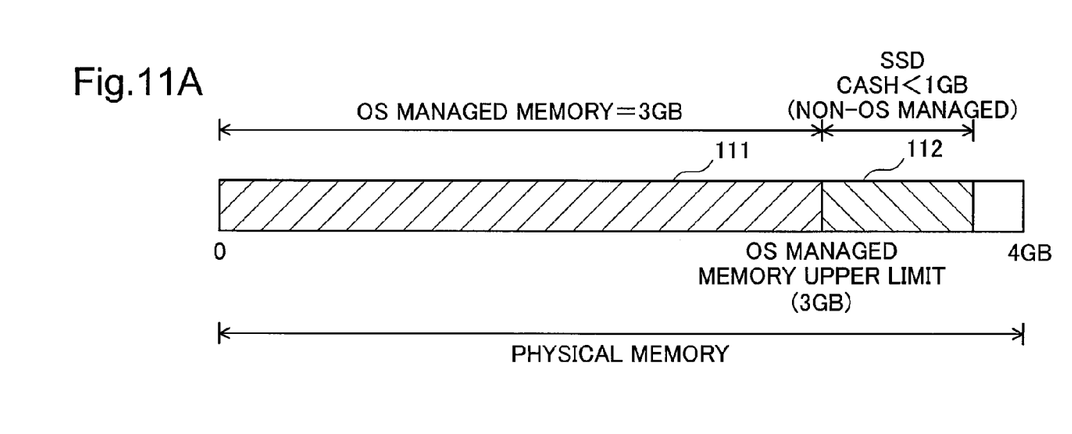
FIGS. 11A and 11B are illustrations depicting the memory map in a modified example of Embodiment 2
Figure 11B:
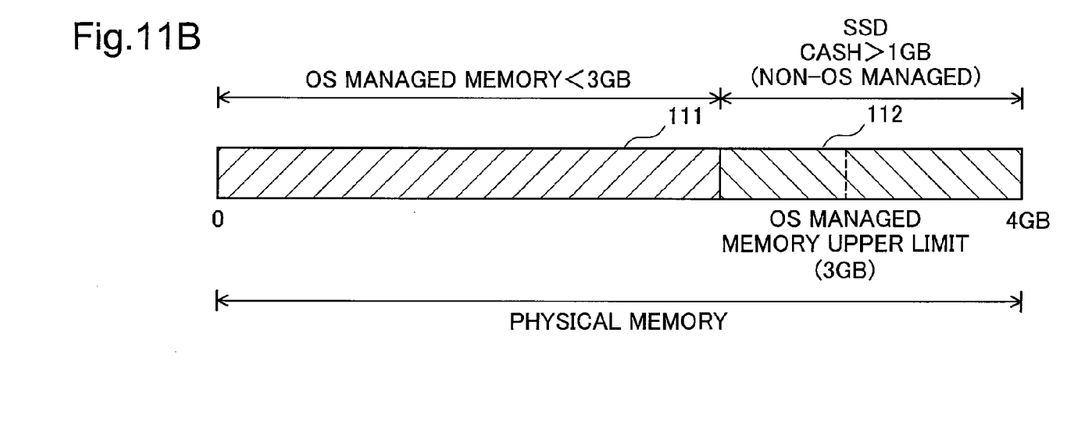

FIG. 11 an illustration depicting the memory map in a modified example of Embodiment 2. In the example shown in FIG. 11A, part of the 1 GB equivalent to the total 4 GB capacity to the RAM 110 minus the 3 GB upper memory limit of the OS is used as the SSD cache 112. Thus, where the RAM 110 exceeds the upper memory limit of the OS, it is acceptable for the SSD cache 112 to be constituted from only a portion of this surplus, rather than its entirety. With regard to the area of the RAM 110 used neither for the OS managed area 111 or for the SSD cache 112, there is no particular need for the area to be used. In the example depicted in FIG. 11B, the size of the OS managed area 111 is smaller than the 3 GB upper memory limit of the OS, and the size of the SSD cache 112 is greater than the 1 GB equivalent to the 3 GB upper memory limit of the OS subtracted from the 4 GB of the RAM 110. Thus, it is acceptable for the OS managed area 111 to be smaller than the upper memory limit of the OS and for the SSD cache 112 to be correspondingly larger.

Figure 12:
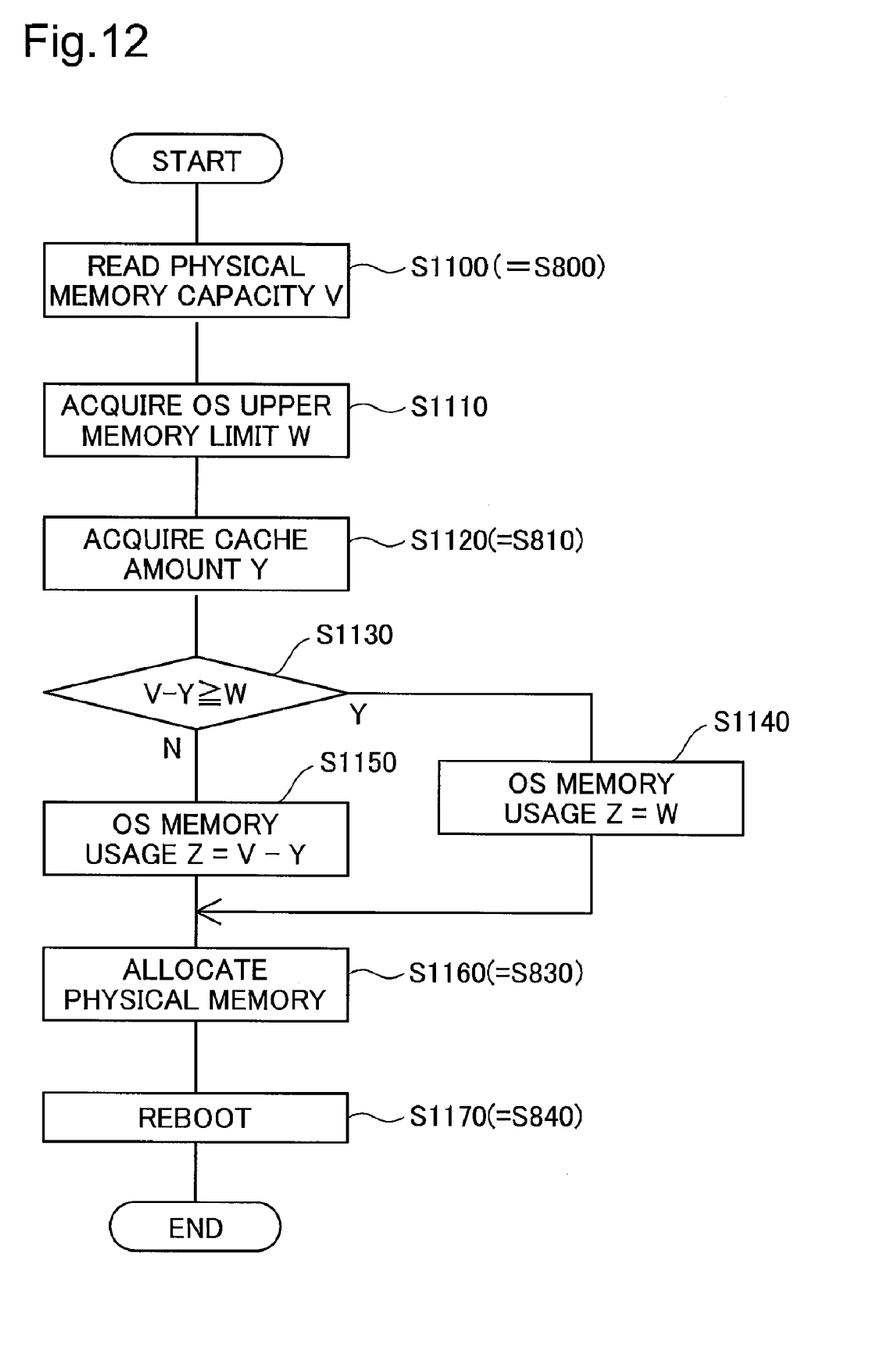
FIG. 12 is a flowchart depicting the procedure for installing or changing the settings of the SSD driver in Embodiment 2.

FIG. 12 is a flowchart depicting the procedure for installing or changing the settings of the SSD driver in Embodiment 2 and in the modified example thereof; the drawing corresponds to FIG. 8 of Embodiment 1. Embodiment 2 is the same as Embodiment 1 in terms of the overall configuration of the device (FIG. 1) and the process of FIG. 9. In Step S1100, the install program acquires the amount V of physical memory (RAM 110) installed in the computer 10 from the OS. In Step S110, it acquires the upper memory limit W of the OS. It is possible for this value W to be acquired from the OS. In Step S1120, the install program acquires the capacity Y of the cache 112 for the SSD 120. This value Y is input by the user from an interface screen displayed on the display monitor 200 for example.

In Step S1130, the install program decides whether the value of physical memory capacity V minus the SSD cache capacity Y is greater or less than the upper memory limit W of the OS. If V-Y is greater than W, in Step S1140, the OS managed area 111 size Z is set to the upper memory limit W of the OS. On the other hand, if V-Y is less than W, in Step S1150 the OS managed area 111 size Z is set to the equivalent of the physical memory capacity V minus the SSD cache capacity Y. If the value of physical memory capacity V minus the SSD cache capacity Y is equal to the upper memory limit W of the OS, because the OS managed area size Z equals the physical memory capacity V minus the SSD cache capacity Y, Steps S140 and S1150 are identical for either route.

In Step S1160, the install program sets up a memory usage level for the OS and a memory usage level for the SSD cache in the boot file. This operation is identical to the operation in Step S830. In Step S1170, the install program displays on the monitor display 200 a message prompting the user to perform a reboot.

Thus, according to Embodiment 2, it is possible to switch usage conditions of the RAM 110 according to the physical memory capacity, the cache capacity acquired from the user, and the upper memory limit of the OS. Particularly when the physical memory installed exceeds the upper memory limit W of the OS, the surplus is allocated to the SSD cache 112 on a preferential basis. It is accordingly possible to acquire the SSD cache 112 without reducing the size of the OS managed area 111.

While the preceding description relates to an example of an SSD 120 as the external storage device, the external storage device may be another device such as a hard disk device, CD, or DVD for example. For these other external storage devices as well, by providing a cache that is not managed by the OS, data can be transferred independently of any influence of the OS, making it possible to speed up the perceived speed of processing.

In the present embodiment, a device driver was used as the management software for utilizing the cache memory of the SSD 120, it would be possible to use a utility software instead.

While the present invention has been shown hereinabove through certain preferred embodiments, the embodiments of the invention set forth herein are intended merely to aid understanding of the invention and should in no wise be construed as limiting thereof. Various modifications and improvements to the invention are possible without departing from the spirit thereof as set forth in the appended claims and shall be considered to fall within the scope of equivalents of the present invention.

What is claimed is:

1. A method to speed up access to an external storage device whose memory cell is a flash memory for accessing to the external storage device whose memory cell is a flash memory, comprising the steps of:
    (a) during startup of a computer, setting up part of a physical memory of the computer as a cache memory for use by the external storage device whose memory cell is a flash memory, in the form of a continuous physical memory area outside the physical memory area that is managed by an operating system of the computer;
    (b) upon detection of a request to write data to the external storage device whose memory cell is a flash memory, writing the data to the cache memory; and
    (c) sending the data written in the cache memory to the external storage device whose memory cell is a flash memory to be saved therein, wherein the data in the cache memory is sent to the external storage device when the size of the data saved in the cache memory has reached or exceeded the size of a memory block, wherein the memory block is a unit in which data erasing takes place together with data writing in the flash memory of the external storage.

2. The method in accordance with claim 1, wherein the step (a) includes the step of
    if the physical memory capacity exceeds a maximum manageable capacity of the operating system to have an excessive physical memory area that exceeds the maximum manageable capacity and a manageable physical memory area managed by the operating system, setting up the cache memory preferentially in the excessive physical memory area than in the manageable physical memory area.

3. The method in accordance with claim 2, wherein the step (a) includes the step of
    if a remainder left after subtracting the maximum manageable capacity of the operating system from the physical memory capacity is less than the capacity of the cache memory, reducing the amount of physical memory managed by the operating system by an equivalent of the remainder.

4. An external storage system for use by a computer, comprising:
    a computer having a physical memory;
    an external storage device whose memory cell is a flash memory; and
    management software for accessing to the external storage device whose memory cell is a flash memory;
    wherein the management software:
    sets up part of the physical memory of the computer as a cache memory for use by the external storage device whose memory cell is a flash memory, in the form of a continuous physical memory area outside the physical memory area that is managed by the operating system of the computer;
    upon detecting a request to write data to the external storage device whose memory cell is a flash memory, writes the data to the cache memory; and
    sends the data written in the cache memory to the external storage device whose memory cell is a flash memory to be saved therein, wherein the data in the cache memory is sent to the external storage device when the size of the data saved in the cache memory has reached or exceeded the size of a memory block, wherein the memory block is a unit in which data erasing takes place together with data writing in the flash memory of the external storage.

* * * * *